July 26, 1932.  R. STRESAU  1,868,998

METHOD OF ELECTRIC ARC WELDING

Filed May 13, 1929

INVENTOR.

Richard Stresau

BY

ATTORNEY.

Patented July 26, 1932

1,868,998

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

METHOD OF ELECTRIC ARC WELDING

Application filed May 13, 1929. Serial No. 362,714.

This invention relates to a method of electric arc welding and particularly to electric arc welding thick metal plates wherein the edges are joined by fusion with metal deposited from a fusible metallic weldrod by means of an electric arc.

The invention is particularly adapted to the manufacture of thick walled pressure vessels as set forth in Reissue Patent #16,865, issued to L. R. Smith.

The object of the invention is to provide a method of electric arc welding which is more rapid and efficient and which will produce large welds of high quality.

The invention may be more readily understood by reference to the accompanying drawing in which the views are as follows.

In carrying out the invention, the thick metal plates 1 and 2 to be welded are chamfered to provide edges having suitable lips 3 and 4, respectively, at their lower corners. The edges when juxtaposed form a substantially U-shaped welding groove 5 therebetween with the lips 3 and 4 meeting to form the bottom of the groove. The groove 5 is designed to require a minimum of deposited metal and to thereby eliminate excessive tension stresses which are detrimental in the welding of thick metal plates as in the manufacture of pressure vessels for the oil cracking industry.

The size of the groove is dependent upon the thickness of the plates and other factors, it being preferable to employ a groove having a width not exceeding about one-half the thickness of the plates being welded. Where too narrow a welding groove is employed, there is danger of insufficient fusion of the metals and of entrapment of impurities in the weld. Where too large a welding groove is employed, an excessive amount of deposited metal is required to complete the weld and excessive tension stresses may be set up in the weld endangering the strength thereof.

In the welding of metal plates of from two to four inches in thickness, it has been found preferable to employ a welding groove of approximately one to one and a half inches in width. The above is true where welding medium to low carbon steels, but where alloy steels or other metals are to be welded, the heat conductivity and characteristics of the metal may be such as to require grooves of different width to accomplish the purposes of the invention.

Figure 1:
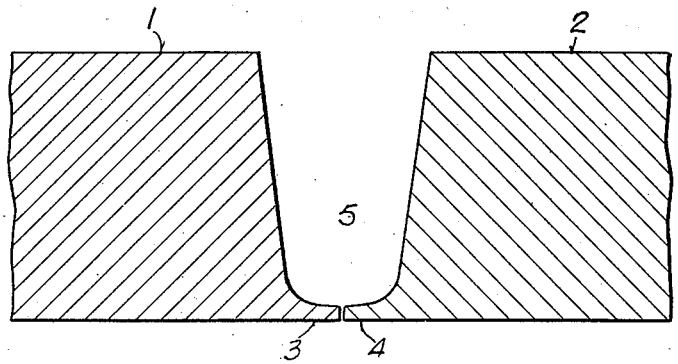
Figure 1 is a transverse sectional view illustrating the edges of the plates in welding position.
Figure 2:
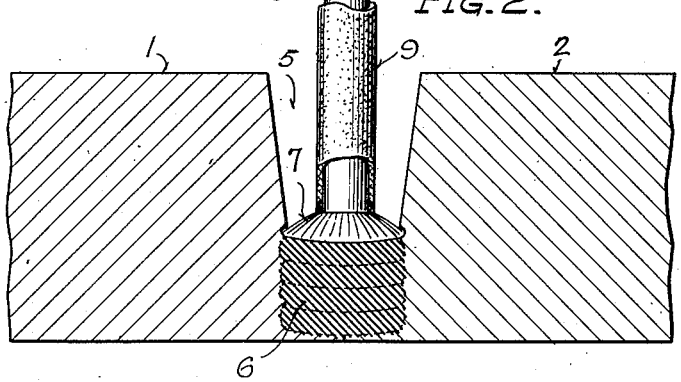
Fig. 2 is a similar view illustrating the welding of the plates.
Figure 3:
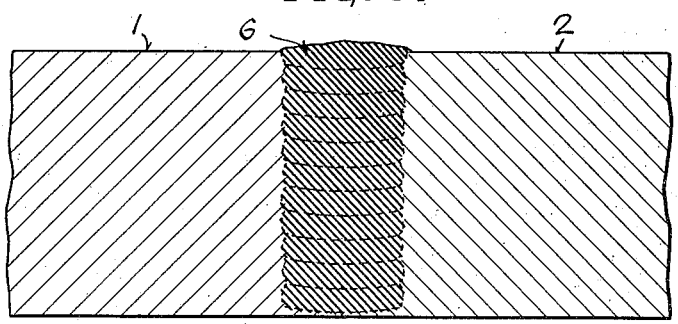
Fig. 3 is a similar view illustrating the finished weld.

The welding groove 5 preferably has its side walls diverging as set forth in the co-pending application Serial Number 339,293 filed Feb. 12, 1929, by the present inventor although other forms of grooves may be employed. The diverging side walls are gradually drawn together by the tension of the cooling welding metal as the welding operation proceeds, thus maintaining a substantially uniform width of groove for receiving the metal being deposited. This is clearly shown in Fig. 2 where the groove is shown as about one-half full of deposited welding metal 6.

The metal 6 is deposited by means of an electric arc 7 from a fusible metallic weldrod 8, the arc being established between one end of the weldrod and the lips 3 and 4 or the successive layers of the deposited metal 6, as the welding proceeds.

The weldrod employed is preferably of such size as to effect a deposit of fusing welding metal for the full width of the groove by a single substantially straight pass therealong.

When welding a groove of approximately one inch to one and one-quarter inches in width, it has been found preferable to employ a weldrod of about $\frac{7}{16}$ inch in diameter. In order to obtain the desirable deposit of fusing welding metal from such a large weldrod, a greater electrical energy is employed and the current values at the arc, where a rod of approximately $\frac{7}{16}$ inch diameter is employed, amount to about 50 volts and 900 amperes.

The weldrod is preferably covered with a suitable covering 9, such as the one disclosed in co-pending application Serial No. 14,939, filed March 12, 1925, by the present inventor, the covering comprising a mixture of wood flour or suitable carbo-hydrate material and sodium silicate. This covering is effective to surround the arc with a deoxidizing atmosphere which protects the metal vapor and finely divided molten metal being projected through the arc and the fusing metal in the pool from contamination and oxidation, thus producing welding metal substantially free from impurities and oxides and nitrides. The covering also is effective to facilitate the control and stabilization of the arc length and thereby produce more uniform welding conditions.

The relation between the size of the weldrod, the current values employed, and the width of the groove is of importance since the large pool of fusing welding metal produced by the high current and the large size weldrod extends from edge to edge of the plates behind the arc and upon solidifications forms a unitary layer of fused welding metal in the groove as distinguished from the deposition of beads. For this purpose, it has been found preferable to employ a weldrod having a diameter ranging between one-third and one-half of the width of the groove.

The electrode may be moved transversely of the groove to some extent in order to insure a proper penetration of the heat of the arc into the substantially perpendicular side walls of the groove so that a proper fusion of the metals is obtained. However, the pool of fused welding metal extends entirely across the groove and there is an entire absence of detrimental characteristics accompanying the ordinary method of welding by deposition of beads. In this manner, the weld is made in unitary interfused layers as distinguished from a plurality of beads.

When employing the weldrod, welding groove, and arc current values as above set forth, the blowing action of the arc removes substantially all of the molten metal from beneath the arc and transfers the same to the pool behind the arc. The arc is thereby caused to heat the surface metal of the plates or of the previously deposited metal in the groove to a fusing temperature and as the arc traverses the seam the molten pool following in the wake of the arc fuses with the surface heated by the arc to produce the weld.

The pool is of such depth and area as to effect an escape of occluded gases from the molten weld metal thereof. For instance, when employing a covered weldrod of $\frac{7}{16}$ inch diameter with arc current values approximately 900 amperes, as above set forth in the welding of steel, the pool is about $\frac{1}{4}$ inch in depth and has an area in excess of 10 times the cross sectional area of the metal core of the weldrod. This size and depth of pool is such that the occluded gases readily escape from the weld metal while the latter is in its molten state and the solidified weld metal produced is more free from porosity and blow holes. Where the pool is of greater size and depth in welding ordinary steel the above function of removal of gases is obtained but a decided injury to the grain structure of the metal results, the metal adjacent and below the pool being subjected to an over heating causing grain growth. Where the pool is of less depth and area the escape of gases may not be as fully realized, and the heat treatment and refinement of grain structure hereinafter referred to is not as complete.

The specific size of pool will vary with different alloys or metals being welded. The size of the pool for any given sized weldrod may be controlled within narrow limits by the rate of advance of the arc along the seam, such rate being at least sufficient to prevent flooding of the molten metal of the pool beneath or ahead of the arc.

The uniform and simultaneous distribution of heat for the full width of the groove eliminates the setting up of excessive tension stresses in the welding metal since the central portion of the welding metal remains heated during the cooling of the outer portions and is sufficiently ductile to relieve any tension that might otherwise have been set up by the cooling of the outer and major portion of the welding metal.

Tests have shown that the metal deposited in welding by the method of the present invention is often more pure than the metal of the weldrod. This is accounted for by the fact that the deoxidizing atmosphere with which the arc and fusing metal are surrounded protects the metallic vapor of the arc from contamination and allows an escape of impurities therefrom. Furthermore, the atmosphere produced by the covering above referred to has been found to prevent the formation of nitride needles in the weld metal and to effect a distillation of the impurities of the weldrod metal. Any slag which may be formed by the fluxing ingredients of the covering material may be removed prior to the deposition of the next layer of welding metal in the groove so that the metal of the weld is substantially free from impurities from top to bottom as well as transversely and longitudinally.

Furthermore, the method of depositing metal in unitary layers in large welding grooves provides a homogeneous structure throughout the welding metal and extending entirely across the same so that the strength of the weld is maximum in comparison with the heterogeneous structure provided by methods in which beads are formed in the welding groove. The regional heating and cooling of the welding metal instead of the local limited heating and cooling of the same tends to set up more uniform stress conditions within the weld itself and the heating of each respective layer of the weld tends to heat treat the layer or layers below the same to refine the metal of said layers. This refinement of the grain structure of the fused metal adds greatly to the strength of the weld, and welds produced in this way have exhibited greater strength than the plate metal which was welded.

The insulating character of the covering 9 permits the employment of a U-shaped welding groove and a weldrod proportioned in accordance therewith, as above set forth, and prevents the transposition of the arc from the end of the weldrod up along the side of the same due to the nearness of the side walls of the groove to the weldrod.

The invention has been successfully applied to the manufacture of thick walled pressure vessels for the oil cracking industry wherein welded seams of great length and thickness have withstood pressures and temperatures equally as well as the plate metal.

I claim:

1. The method of electric arc welding, which comprises arranging the plates in welding proximity with a welding groove of substantially U-shape therebetween, employing a covered metallic weldrod and establishing an electric arc between the end of said weldrod and the metal to be welded, applying a welding current of high value to pool the fusing welding metal simultaneously for the full width of the groove and to heat treat the metal below the pool to refine the same, and passing the weldrod along the groove a plurality of times until the plates to be welded are united by a deposit of fused welding metal in unitary interfused layers of uniform metallic grain structure.

2. In metallic electric arc welding metal plates of 1 inch or more in thickness, providing a welding groove of substantially U-shape and of approximately 1 inch in width between said plates, employing a fusible metallic weldrod of approximately $\frac{7}{16}$ inch diameter having an insulated covering thereon of characteristics effecting a distillation of the impurities of the weldrod metal during the welding operation, employing arc current values approximating in excess of 35 volts and 700 amperes and producing therewith during the welding operation a molten pool of weld metal following in the wake of the arc, extending from wall to wall of the groove, approximating $\frac{1}{4}$ inch in depth, and of an area in excess of ten times the cross-sectional area of the weldrod, which will effect an escape of occluded gases from the molten weld metal and which will heat the metal beneath the same for the depth of a layer of deposited weld metal and also adjacent thereto to a temperature effecting a refinement in grain structure of the heated metal, while causing the welding arc to heat the surface of the metal to be welded in advance of the pool to a molten state in preparation for its fusion with the molten metal of the pool as the weldrod is advanced along the pool at a rate which will prevent a prolonged seam at a rate which will prevent a prolonged heating of the refined metal, and in this manner depositing a plurality of superimposed interfused layers of weld metal in the groove.

3. The method of electric arc welding thick metal plates, which comprises providing between the plates a substantially U-shaped welding groove of a width permitting the deposit of sound weld metal free from entrapped impurities, employing a covered metal welding electrode having a metallic core of a diameter approximately from one-third to one-half the width of the welding groove, the covering of the electrode being of a composition which when subjected to the heat of the arc will produce a protecting gaseous vapor in and about the arc of such kind and in such quantity as to prevent contamination of the weld metal passing through the arc and of the molten weld metal in the groove, establishing an electric arc between one end of the electrode and the metal at the bottom of the groove with substantially high arc welding current values, advancing the electrode and arc along the groove at a rate which will effect the formation of a molten pool of fusing weld metal following in the wake of the arc and of a size effecting the escape of impurities therefrom and effecting the heating of the metal therebeneath for the depth of a layer of deposited weld metal, and adjacent thereto, to a temperature and for a period of time resulting in a refinement of the grain structure of the heated metal while the arc is caused to progressively advance upon the metal at the bottom of the groove ahead of the pool and to prepare the same for fusion with the molten metal of the pool as the latter follows in the wake of the arc, and repeating said operations in depositing a plurality of layers of weld metal in the groove to produce a welded joint the metal of which is of substantially uniform refined grain structure and substantially free from impurities and contaminations.

4. The method of electric arc welding thick steel plates which comprises, providing between the plates a substantially U-shaped welding groove of a width approximating from one to one and one-quarter inches, employing a covered metal welding electrode having a metallic core of approximately $\frac{7}{16}$ inch in diameter, the covering of the electrode containing a carbohydrate material of cellulosic or starchy nature and sodium silicate, establishing an electric arc between one end of the electrode and the metal at the bottom of the groove with arc current values approximating from 35 to 50 volts and 700 to 900 amperes, advancing the electrode and arc along the groove at a rate which will effect the formation of a molten pool of fusing weld metal following in the wake of the arc, extending from wall to wall of the groove, and approximately one-quarter inch in depth and of an area approximating ten times the cross-sectional area of the metallic electrode core while the arc is caused to progressively advance upon the metal at the bottom of the groove ahead of the pool and to prepare the same for fusion with the molten metal of the pool following in the wake of the arc, and repeating said operations in depositing a plurality of layers of weld metal in the groove to produce a welded joint, the metal of which is of substantially uniform refined grain structure and substantially free from impurities and contaminations.

5. The method of electric arc welding thick metal plates which comprises, providing between the plates a substantially U-shaped welding groove of a width permitting the deposit of sound weld metal free from entrapped impurities, employing a metallic welding electrode having a covering of a composition which when subjected to the heat of the arc will produce a protecting gaseous vapor in and about the arc of such kind and in such quantity as to prevent contamination of the weld metal passing through the arc and of the molten weld metal in the groove, establishing an electric arc between one end of the electrode and the metal at the bottom of the welding groove, advancing the electrode and arc along the groove at a rate which will effect the formation of a molten pool of weld metal following in the wake of the arc and of a size effecting the escape of impurities therefrom and effecting a heating of the metal therebeneath for the depth of a deposit from one pass of the electrode along the groove, and adjacent thereto, to a temperature and for a period of time resulting in a refinement of the grain structure of the heated metal while the arc is caused to progressively advance upon the metal at the bottom of the groove ahead of the pool and to prepare the same for fusion with the molten metal of the pool as the latter follows in the wake of the arc, and repeating said operations in successively passing the electrode along the groove until the latter is filled with deposited weld metal having substantially uniform refined grain structure and substantially free from impurities and contaminations.

6. The method of electric arc welding thick metal plates which comprises, providing between the parts to be welded a substantially U-shaped welding groove, employing a metallic welding electrode having a covering of a composition which when subjected to the heat of the arc will produce a protecting gaseous vapor in and about the arc of such kind and in such quantity as to prevent contamination of the weld metal passing through the arc and of the molten weld metal in the groove and to provide in the welding operation a great amount of heat per unit of metal deposited, advancing the electrode and arc along the groove at a rate which will effect the formation of a molten pool of weld metal following in the wake of the arc and of a size effecting a heating of the metal therebeneath for the depth of a deposit from one pass of the electrode along the groove, and adjacent thereto, to a temperature and for a period of time resulting in a refinement of the grain structure of the heated metal, and repeating said operations in successively passing the electrode along the groove to effect the refinement of the metal beneath during each pass for substantially the entire depth of a deposit of metal resulting from such pass and provide a uniform refinement of the metal at the juncture of the weld and plate, while obtaining deposits of substantially equal thickness by the several passes of the electrode along the groove.

In witness whereof I have signed my name at Milwaukee, Wisconsin, this 9th day of May, 1929.

RICHARD STRESAU.